United States Patent
Olson et al.

(10) Patent No.: US 6,370,445 B1
(45) Date of Patent: Apr. 9, 2002

(54) SYSTEM FOR CONTROLLING FEEDERS OF A PACKAGE ASSEMBLY APPARATUS

(75) Inventors: Larry A. Olson, Naperville; James A. Trchka, Clarendon Hills, both of IL (US); William T. Montgomery, Lancaster, PA (US)

(73) Assignee: R. R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 09/148,213

(22) Filed: Sep. 4, 1998

Related U.S. Application Data

(62) Division of application No. 08/540,937, filed on Oct. 11, 1995, now Pat. No. 5,838,574.

(51) Int. Cl.$^7$ ............................................... G06F 17/00
(52) U.S. Cl. ........................ 700/219; 700/224; 700/223
(58) Field of Search ................................ 700/219–226, 700/213; 270/52.01, 52.02, 52.04, 52.05, 58.02, 58.03, 52.19; 235/375, 380

(56) References Cited

U.S. PATENT DOCUMENTS

| | | | |
|---|---|---|---|
| 3,608,888 A | 9/1971 | McCain et al. | 270/54 |
| 3,819,173 A | 6/1974 | Anderson et al. | 270/54 |
| 3,892,427 A | 7/1975 | Kraynak et al. | 281/15 |
| 3,917,252 A | 11/1975 | Harder et al. | 270/58 |
| 3,982,744 A | 9/1976 | Kraynak et al. | 270/12 |
| 4,022,455 A | 5/1977 | Newsome et al. | 270/54 |
| 4,027,142 A | 5/1977 | Paup et al. | 235/61.9 |
| 4,121,818 A | 10/1978 | Riley et al. | 270/54 |
| 4,149,711 A | 4/1979 | Jackson | 270/57 |
| 4,338,768 A | 7/1982 | Ballestrazzi et al. | 53/495 |
| 4,395,031 A | 7/1983 | Gruber et al. | 270/54 |
| RE31,710 E | 10/1984 | Jackson | 270/57 |
| 4,484,733 A | 11/1984 | Loos et al. | 270/54 |
| 4,500,083 A | 2/1985 | Wong | 270/54 |
| 4,552,349 A | 11/1985 | Loos et al. | 270/54 |
| 4,576,370 A | 3/1986 | Jackson | 270/54 |
| 4,585,220 A | 4/1986 | Zemke et al. | 270/54 |
| 4,790,119 A | 12/1988 | McDaniels | 53/411 |
| 4,948,109 A | 8/1990 | Petersen | 270/1.1 |
| 4,989,850 A | 2/1991 | Weller | 270/1.1 |
| 5,039,075 A | 8/1991 | Mayer | 270/1.1 |
| 5,067,088 A | 11/1991 | Schneiderhan | 364/478 |
| 5,068,797 A | 11/1991 | Sansone et al. | 364/478 |
| 5,072,401 A | 12/1991 | Sansone et al. | 364/478 |
| 5,079,714 A | 1/1992 | Manduley et al. | 364/478 |
| 5,100,116 A | 3/1992 | Graushar | 270/1.1 |
| 5,114,128 A | 5/1992 | Harris, Jr. et al. | 270/11 |
| 5,143,362 A | 9/1992 | Doane et al. | 270/1.1 |
| 5,171,005 A | 12/1992 | Manley et al. | 270/1.1 |
| 5,186,443 A | 2/1993 | Manley et al. | 270/1.1 |
| 5,283,752 A | 2/1994 | Gombault et al. | 364/478 |
| 5,419,541 A | 5/1995 | Stevens | 270/57 |

*Primary Examiner*—William Grant
*Assistant Examiner*—Steven R. Garland
(74) *Attorney, Agent, or Firm*—Marshall, Gerstein & Borun

(57) ABSTRACT

A system controls a package assembly line. The package assembly line has a piece feeder and a component feeder. The piece feeder is arranged to feed pieces to a transport of the package assembly line. The component feeder is arranged to feed components to the transport of the package assembly line so that the components and the pieces are combined into packages. The components have corresponding component identifiers thereon. The system includes a memory for storing a piece data file having piece identifiers corresponding to pieces fed by the piece feeder, a detector for detecting a component identifier from a component being fed by the component feeder toward the transport, a comparator for comparing the detected component identifier to a corresponding piece identifier, and in response to the comparison controlling the feeding of a component or rejecting a component.

40 Claims, 7 Drawing Sheets

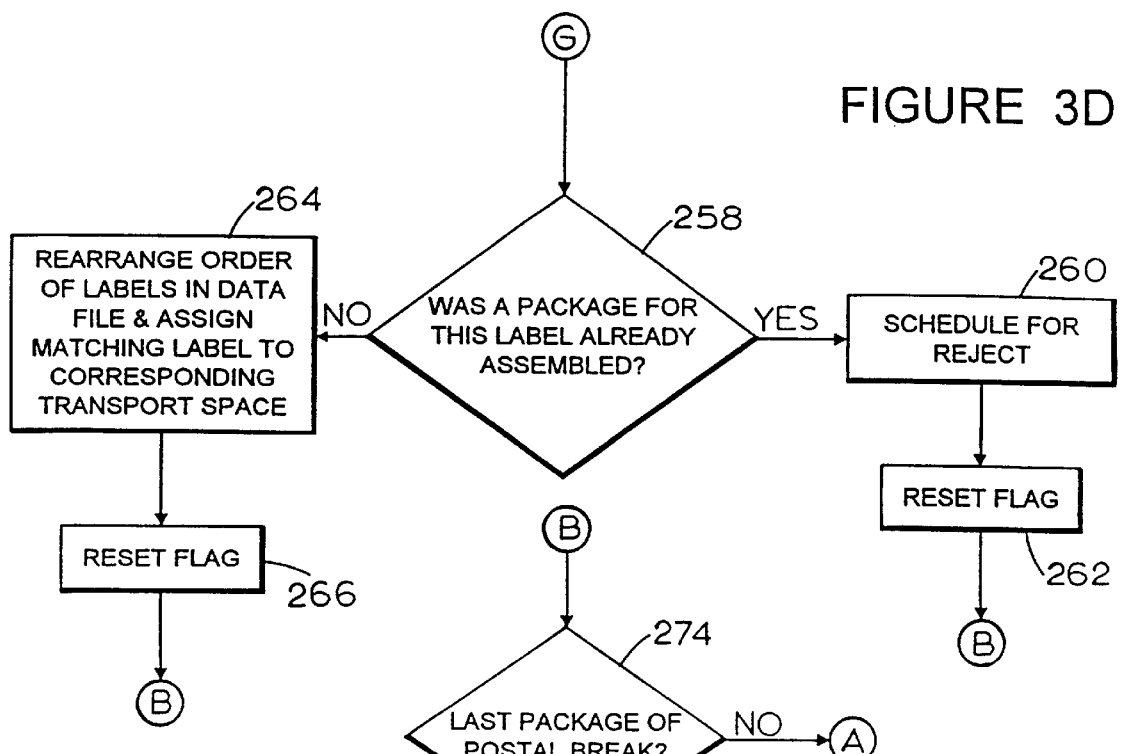
FIGURE 3D
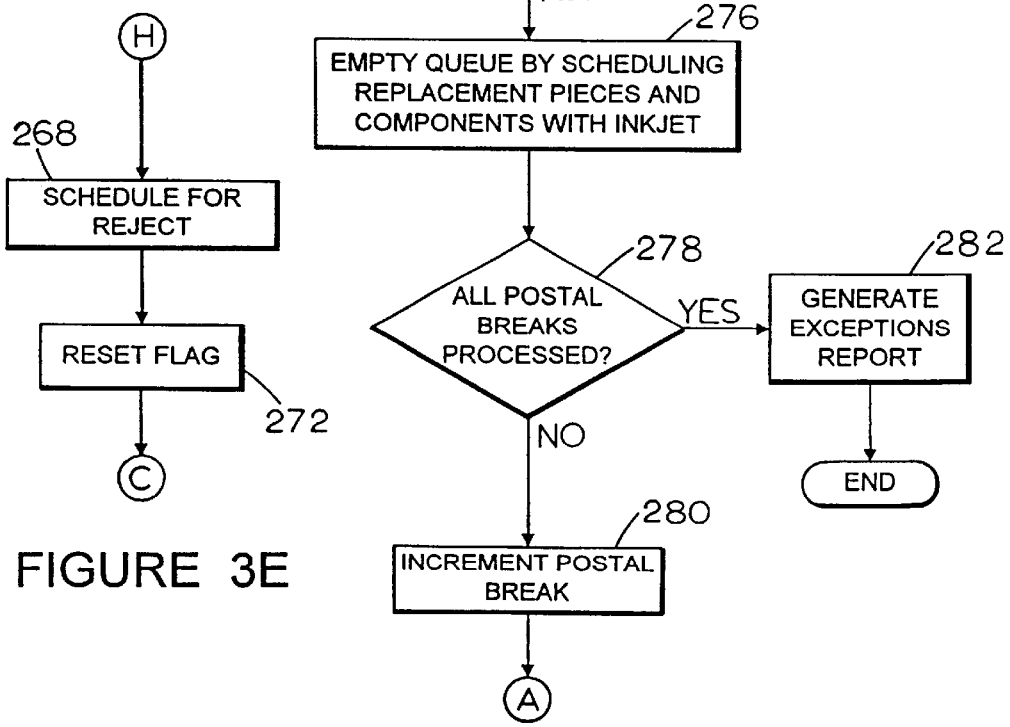
FIGURE 3E
FIGURE 3F

| LABEL | COMPONENT | COMPONENT LIST | QUEUE |
|---|---|---|---|
| A | A | A | C ←306 |
| B ←300 | B | B | F |
| C | B | C | |
| D | D ←302 | D ←304 | |
| E ✗ | AH | F | |
| F | *** | G | |
| G | G | H | |
| H | H | I | |
| I | C | J | |
| J | I | K | |
| K | K | L | |
| L | J | M | |
| M | P | N | |
| N | L | O | |
| ↘308 | M | P | |
| | N | Q | |

FIGURE 4

SYSTEM FOR CONTROLLING FEEDERS OF A PACKAGE ASSEMBLY APPARATUS

This is a divisional of U.S. application Ser. No. 08/540,937, now U.S. Pat. No. 5,838,574, filed Oct. 11, 1995.

TECHNICAL FIELD OF THE INVENTION

The present invention relates to a system for controlling the assembly of packages comprising pieces and components and, more particularly, to a system for controlling the feeding of pieces and components to form packages to be mailed or otherwise conveyed to customers.

BACKGROUND OF THE INVENTION

Binding lines and mail tables are currently employed as package assembly lines for assembling pieces and components into packages and for sorting the packages in order to achieve increased delivery (e.g., postal) discounts. In terms of a binding line, the packages which are assembled are magazines, newspapers, catalogs, books, or the like, and the pieces and components which are assembled into these packages are signatures and inserts/onserts, respectively. The binding line includes a plurality of piece feeders and component feeders which feed signatures and inserts/onserts to a transport in the form of a gathering chain in order to assemble packages from the signatures and inserts/onserts.

The binding line may also include a trimmer for trimming excess paper from the packages, a reject station for rejecting improperly formed packages, and a stacker for stacking the non-rejected packages. The binding line may be arranged so that the stacker stacks the packages by walk sequence, carrier route, zip code, sectional center facility, or other delivery discount structure. In addition, a controller synchronizes the feeding of the signatures and inserts/onserts to the transport so that each transport space receives the correct combination of signatures and inserts/onserts.

In terms of a mail table, the packages which are assembled are typically stuffed envelopes to be mailed or otherwise sent to customers, the pieces are different versions or titles of magazines, newspapers, catalogs, books, or the like, and the components are inserts/onserts. The mail table assembles and wraps the pieces and components into packages for mailing to customers. The mail table includes a plurality of piece feeders and component feeders which feed versions/titles and inserts/onserts to a transport in order to assemble packages from the versions/titles and inserts/onserts.

The mail table may also include a reject station for rejecting improperly formed packages, a poly-wrapper for stuffing combinations of versions/titles and inserts/onserts into thermoplastic envelopes or wraps, a poly-wrap shrink tunnel for sealing the thermoplastic envelope, and a stacker for stacking the non-rejected packages. The mail table is typically arranged so that the stacker stacks the packages by walk sequence, carrier route, zip code, sectional center facility, or other delivery discount structure. In addition, a controller synchronizes the feeding of the versions/titles and inserts/onserts to the transport so that each transport space and each customer receives the correct combination of versions/titles and inserts/onserts.

The components, which are fed by one or more of the component feeders of a package assembly line, may be pre-personalized components. A pre-personalized component, for example, may be an onsert which carries the name and address information of a customer and is often used as the address label for the package. When a pre-personalized onsert is fed onto a piece moving along the transport, the piece with the pre-personalized onsert thereon is typically stuffed into a thermoplastic envelope by the poly-wrap machine. The thermoplastic envelope is sealed by the poly-wrap shrink tunnel. This package is then fed to the stacker which stacks the packages in a way to achieve increased delivery discounts.

In these package assembly lines, a controller controls the feeding of pieces and components to the transport. Because at least some of the pieces and components may be specific to individual customers or to groups of customers, the pieces and components must be matched in order to ensure that the customers are sent the correct combinations of pieces and components.

Known systems which coordinate the feeding of pieces and components to form packages targeted for specific customers are generally of two types. In a first type of system, the components control the feeding of the pieces. That is, codes, which are carried by the components, are detected by a detector which may be, for example, a code reader or scanner. A controller controls the feeding of pieces to the transport in response to the detected codes on the components so that the correct combinations of pieces and components arrive at the corresponding transport spaces and are thereby assembled into packages. These codes correspond to the names and addresses of customers. By controlling the feeding of pieces in response to these codes, it is hoped that each customer will receive the correct combination of pieces and components.

The pieces are usually supplied by a printer who has printed the pieces in accordance with a data file containing the names and addresses of customers. The components are usually supplied by a supplier who has prepared the components in accordance with a component sequence list. Because the pieces and components are usually supplied from different sources, there is a greater chance of discrepancies between the data file which governs which customers receive which pieces and the components to be added to the pieces. For example, it is often the case that the components in the component feeder are missing, are duplicates, or are otherwise erroneous. When there is a difference between the data file and the components, the package assembly line typically must be shut down until the errors can be corrected. Significant cost penalties may be incurred because of this down time.

In a second type of system, the data file controls the feeding of pieces and components. In this case, the codes on the components in the component feeder are read and compared to the data file. If the components do not match within some standard, the components are rejected and other components are substituted therefor. For example, the codes on the pre-personalized onserts in an onsert feeder are read and compared to the data file. If the pre-personalized onserts do not match within some standard, the pre-personalized onserts are rejected and generic onserts are substituted therefor. An ink jet printer then prints the name and address corresponding to the rejected pre-personalized onsert onto the generic onsert. Because components are costly to create, significant cost penalties may be incurred because of the rejection of numerous components which do not match the sequence of customers in the data file.

The present invention overcomes one or more of the above-described problems.

SUMMARY OF THE INVENTION

Accordingly, in one aspect of the invention, a system for use in connection with a package assembly line includes a storing means, a detecting means, a comparing means, and a list re-sequencing means. The package assembly line has a piece feeder and a component feeder. The piece feeder is arranged to feed pieces to a transport of the package assembly line. The component feeder is arranged to feed components to the transport of the package assembly line so that the components and the pieces are combined into packages. The components have corresponding component identifiers thereon. The storing means stores a piece data file having piece identifiers corresponding to pieces fed by the piece feeder. The detecting means detects a component identifier from a component being fed by the component feeder toward the transport. The comparing means compares the detected component identifier to a corresponding piece identifier in the piece data file. The list re-sequencing means re-sequences the piece data file if the detected component identifier fails to match the corresponding piece identifier.

In accordance with another aspect of the present invention, a system for use in connection with a package assembly line includes a storing means, a detecting means, a comparing means, and a list re-sequencing means. The package assembly line has a piece feeder, a component feeder, and a transport. The transport is divided into transport spaces. The piece feeder is arranged to feed a first piece to a first transport space and a second piece to a second transport space. The component feeder is arranged to feed a first component to the first transport space and a second component to the second transport space. The first component has a first component identifier thereon, and the second component has a second component identifier thereon. The first piece has a first piece identifier associated therewith, and the second piece has a second piece identifier associated therewith. The storing means stores the first and second piece identifiers in a piece data file. The detecting means detects the first component identifier from the first component as the first component is fed by the component feeder toward the first transport space. The comparing means compares the detected first component identifier to the first piece identifier. The list re-sequencing means re-sequences the first and second piece identifiers in the piece data file if the first component identifier fails to match the first piece identifier.

In accordance with yet another aspect of the present invention, a system for use in connection with a package assembly line includes a storing means, a detecting means, a comparing means, and a rejecting means. The package assembly line has a piece feeder, a component feeder, and a transport. The piece feeder is arranged to feed first and second pieces to the transport. The component feeder is arranged to feed first and second components to the transport. The first component has a first component identifier thereon, and the second component has a second component identifier thereon. The storing means stores a component sequence list containing component identifiers corresponding to a desired sequence in which components are to be fed by the component feeder. The detecting means detects the first component identifier from the first component as the first component is fed by the component feeder toward the transport. The comparing means compares the first component identifier to the component sequence list. The rejecting means rejects the first component if the first component identifier fails to match the component sequence list.

In accordance with still another aspect of the present invention, a system for use in connection with a package assembly line includes first and second detecting means and a controlling means. The package assembly line has a piece feeder, a component feeder, and a transport. The piece feeder is arranged to feed pieces to the transport. The component feeder is arranged to feed components to the transport. The components have component identifiers thereon. The first detecting means detects the component identifiers from the components as the components are fed by the component feeder toward the transport. The second detecting means detects the component identifiers from the components as the components are fed by the component feeder toward the transport. The controlling means controls feeding of the components to the transport in response to the detected component identifiers.

In accordance with a further aspect of the present invention, a system for use in connection with a package assembly line includes a storing means, a detecting means, a comparing means, and a controlling means. The package assembly line has a piece feeder and a component feeder. The piece feeder is arranged to feed pieces to a transport of the package assembly line, and the component feeder is arranged to feed components to the transport of the package assembly line so that the components and the pieces are combined into packages. The components have corresponding component identifiers thereon. The storing means stores a piece data file, wherein the piece data file contains piece identifiers grouped by postal break, and wherein the piece identifiers correspond to the pieces fed by the piece feeder. The detecting means detects a component identifier from a component being fed by the component feeder to the transport. The comparing means compares the detected component identifier to piece identifiers up to a corresponding postal break in the piece data file. The controlling means controls feeding of the component to the transport in response to the detected component identifier.

In accordance with yet a further aspect of the present invention, a system for use in connection with a package assembly line includes a storing means, a detecting means, a comparing means, a controlling means, and a report generating means. The package assembly line has a piece feeder, a component feeder, and a transport. The piece feeder is arranged to feed a piece to the transport, and the component feeder is arranged to feed a component to the transport. The component has a component identifier thereon, and the piece has a piece identifier associated therewith. The storing means stores the piece identifier in a piece data file. The detecting means detects the component identifier from the component as the component is fed by the component feeder toward the transport. The comparing means compares the detected component identifier to the piece identifier. The controlling means controls feeding of the component to the transport if the component identifier matches the piece identifier. The report generating means generates an exceptions report if the component identifier fails to match the piece identifier.

BRIEF DESCRIPTION OF THE DRAWINGS

These and other features and advantages will become more apparent from a detailed consideration of the invention when taken in conjunction with the drawings in which:

FIGS. 3A–3F illustrate a flow chart representing a program which may be executed by the processor of the control system illustrated in FIG. 2 in order to control the package assembly line illustrated in FIG. 1; and, FIG. 4 illustrates a set of representative labels and components useful in explaining the present invention.

DETAILED DESCRIPTION

Figure 1:
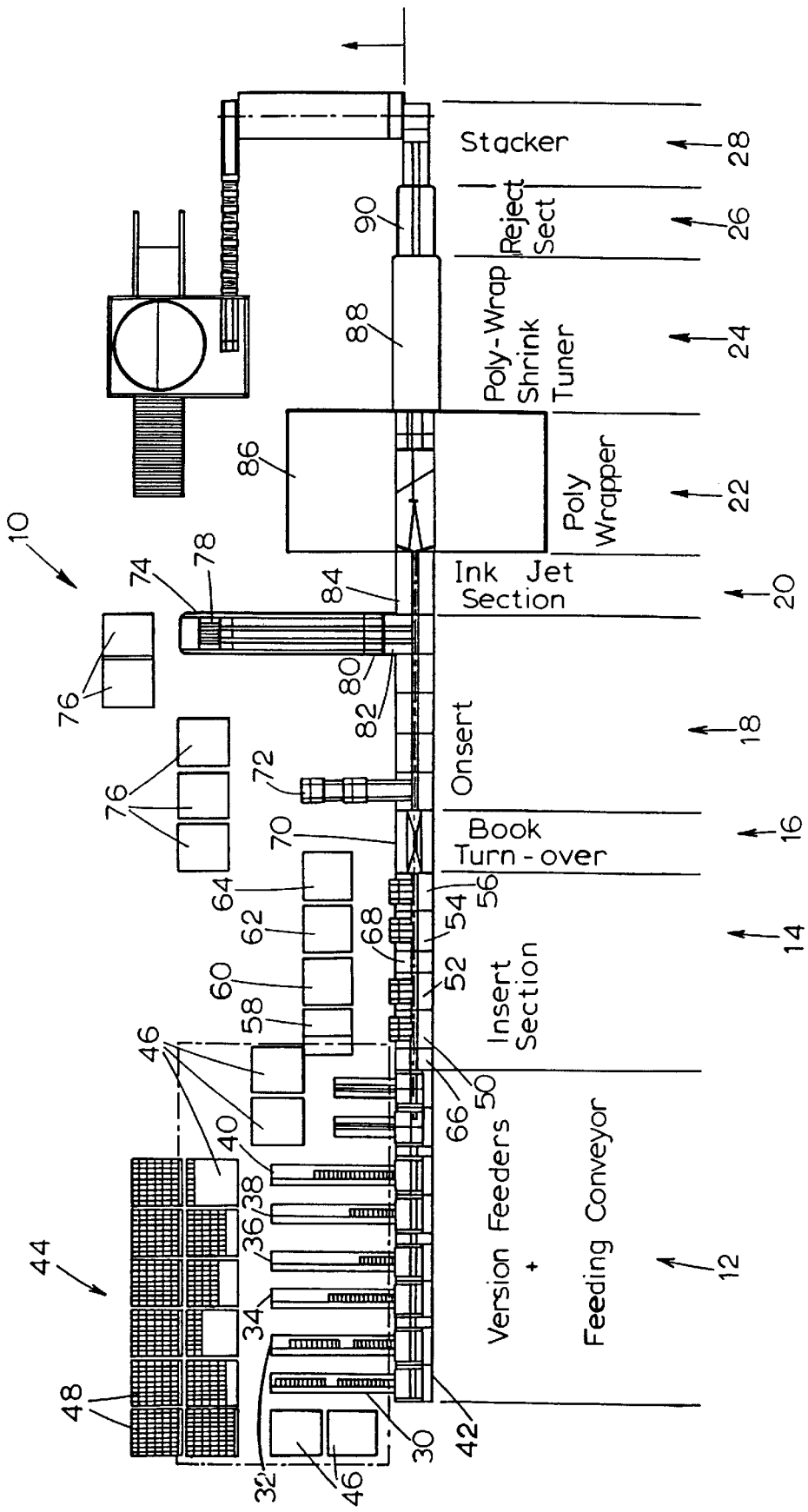
FIG. 1 illustrates a package assembly line in accordance with the present invention.

By way of example, a package assembly line 10 according to the present invention is shown in FIG. 1 in the form of a mail table. Therefore, in the case of FIG. 1, the packages being assembled by the package assembly line 10 are stuffed or wrapped envelopes to be mailed or otherwise delivered to customers, the pieces being fed are different versions or titles of magazines, newspapers, catalogs, books, or the like, and the components being fed are inserts/onserts.

Therefore, as illustrated in FIG. 1, the package assembly line 10 includes a piece feeding section 12, an insert feeding section 14, a book turnover section 16, an onsert feeding section 18, an ink jet section 20, a poly-wrapper section 22, a poly-wrap shrink tunnel section 24, a reject section 26, and a stacking section 28. The piece feeding section 12 includes a plurality of piece feeders 30–40. Each of the piece feeders 30–40 feeds a different piece to a transport 42. The piece feeding section 12 may be a robotic piece feeding section having a plurality of pieces in a holding area 44 waiting to be robotically supplied to each of the piece feeders 30–40 to ensure that these piece feeders maintain an adequate supply of pieces to be fed to the transport 42. The holding area 44 may include a plurality of pallets 46 on which are stacked various pieces 48. In the case of a mail table, the piece feeders 30–40 feed different versions, titles or the like of magazines, newspapers, catalogs, books, or similar articles to the transport 42.

In the case of a binding line, however, the piece feeders 30–40 feed signatures. In this case, the piece feeders 30–40 may be controlled to feed different combinations of signatures to the transport 42 in order to build up different packages for the customers who are to receive them. If the pieces fed by the piece feeders 30–40 are magazines, newspapers, catalogs, books, or the like, each of the piece feeders 30–40 may be arranged to supply a unique version or title to the transport 42.

The insert feeding section 14 includes one or more component feeders. For example, the insert feeding section includes insert feeders 50, 52, 54, and 56 each of which supplies inserts to the transport 42 and each of which may be robotically re-supplied with inserts from corresponding pallets 58, 60, 62, and 64 so that each insert feeder 50, 52, 54, and 56 maintains an adequate supply of inserts to be fed to the pieces moving along the transport 42. Also included in the insert feeding section 14 is, for example, a vacuum/plow opener 66 in order to open the packages moving along the transport 42 so that inserts may be inserted by the insert feeders 50 and 52 into the opened packages before the opened packages close. The insert feeding section 14 may also include a plow opener 68 in order to open the packages moving along the transport 42 so that inserts may be inserted by the insert feeders 54 and 56 into the opened packages before the opened packages close. Other combinations of insert feeders and/or openers may be substituted for the combination of insert feeders and openers shown in FIG. 1.

If necessary or desired, the package assembly line 10 may also include an apparatus 70 in the book turnover section 16 for turning over the books so that a desired side of the book may receive an onsert in the onsert feeding section 18.

The onsert feeding section 18 includes one or more component feeders. For example, the onsert feeding section 18 includes a generic onsert feeder 72, which feeds generic onserts to the packages moving along the transport 42, and a pre-personalized onsert feeder 74, which feeds pre-personalized onserts to these packages. Pallets 76 may be arranged to store generic onserts and pre-personalized onserts. Accordingly, the generic onsert feeder 72 and the pre-personalized onsert feeder 74 may be re-supplied from the pallets 76 with generic onserts and pre-personalized onserts so that these feeders contain adequate supplies of generic onserts and pre-personalized onserts for feeding to the packages moving along the transport 42. Other combinations of onsert feeders may be substituted for the combination of onsert feeders shown in FIG. 1.

The pre-personalized onsert feeder 74 includes a first detector 78, a second detector 80, and a reject/feed gate 82. The first and second detectors 78 and 80 detect component identifiers on the pre-personalized onserts. For example, the first and/or second detectors 78 and 80 may be optical character readers for directly reading the customer name and address information on the pre-personalized onserts as the pre-personalized onserts are fed by the pre-personalized onsert feeder 74 to the packages moving along the transport 42. Alternatively, the first and/or second detectors 78 and 80 may be bar code readers for reading bar codes on the pre-personalized onserts as the pre-personalized onserts are fed by the pre-personalized onsert feeder 74 to the packages moving along the transport 42. These bar codes may be arranged to represent customer names and addresses. Other types of detectors may be used for detecting other types of component identifiers. The reject/feed gate 82 may be any known device that rejects a component to a rejected component bin or allows the component to feed to the transport 42.

As is discussed in more detail hereinafter, the first detector 78 detects component identifiers on components which are fed by the pre-personalized onsert feeder 74 toward the transport 42 so that the component identifiers may be compared to piece identifiers stored in a data file and to component identifiers stored in a component sequence list. The second detector 80 is located near the transport 42 and is used to confirm that the next pre-personalized onsert to be fed to a piece on the transport 42 is the correct component for that piece.

As is known in the art, the generic onsert feeder 72 and the pre-personalized onsert feeder 74 may each include a hopper, which contains onserts, and a conveyor, which moves the onserts from the hopper to the transport 42 in accordance with movement of the transport 42. As will become apparent from the description below, the control system of the present invention controls the onsert feeders asynchronously with respect to movement of the transport 42.

The ink jet section 20 includes an ink jet printer 84. The ink jet printer 84 prints customer name and address information on generic onserts which are fed by the generic onsert feeder 72 to those packages to which the pre-personalized onsert feeder 74 does not feed pre-personalized onserts and which were otherwise intended to receive pre-personalized onserts. It should be recognized, however, that the ink jet printer 84 may be moved to the generic onsert feeder 72 for printing suitable information on the generic onserts before the generic onserts are deposited by the generic onsert feeder 72 onto the packages moving along the transport 42.

For each magazine, newspaper, catalog, book, or similar article which is deposited on the transport 42 by one of the piece feeders 30–40 and which is to receive a pre-personalized onsert, the pre-personalized onsert feeder 74 deposits a pre-personalized onsert on the piece which is to be mailed or otherwise sent to the customer matching the pre-personalized onsert. If there is no pre-personalized piece for that piece, however, the generic onsert feeder 72 deposits a generic onsert on that piece and the ink jet printer 84 prints the name and address of the customer, who is intended to receive that piece, on the generic onsert. The pieces, and their inserts and onserts, if any, are moved by the transport 42 through a poly-wrapper 86 in the poly-wrapper section 22 where the pieces, inserts, and onserts are stuffed or wrapped into thermoplastic bags. The stuffed thermoplastic bags are moved by the transport 42 through a poly-wrap shrink tunnel 88 in the poly-wrap shrink tunnel section 24 in order to seal the thermoplastic bags.

The assembled packages are then supplied by the transport 42 to a reject device 90 in the reject section 26 which, as is known in the art, rejects improperly assembled packages. For example, if feed detectors (not shown), which are associated with one or more of the piece feeders 30–40, the generic onsert feeder 72, and the pre-personalized onsert feeder 74, detect an improper feed, the package assembly line 10 tracks the improperly formed packages and controls the reject device 90 to reject the improperly formed packages. Non-rejected packages are fed to the stacking section 28 where the packages are stacked for placement in bundles, bags, and/or pallets so as to achieve increased delivery discounts.

Figure 2:
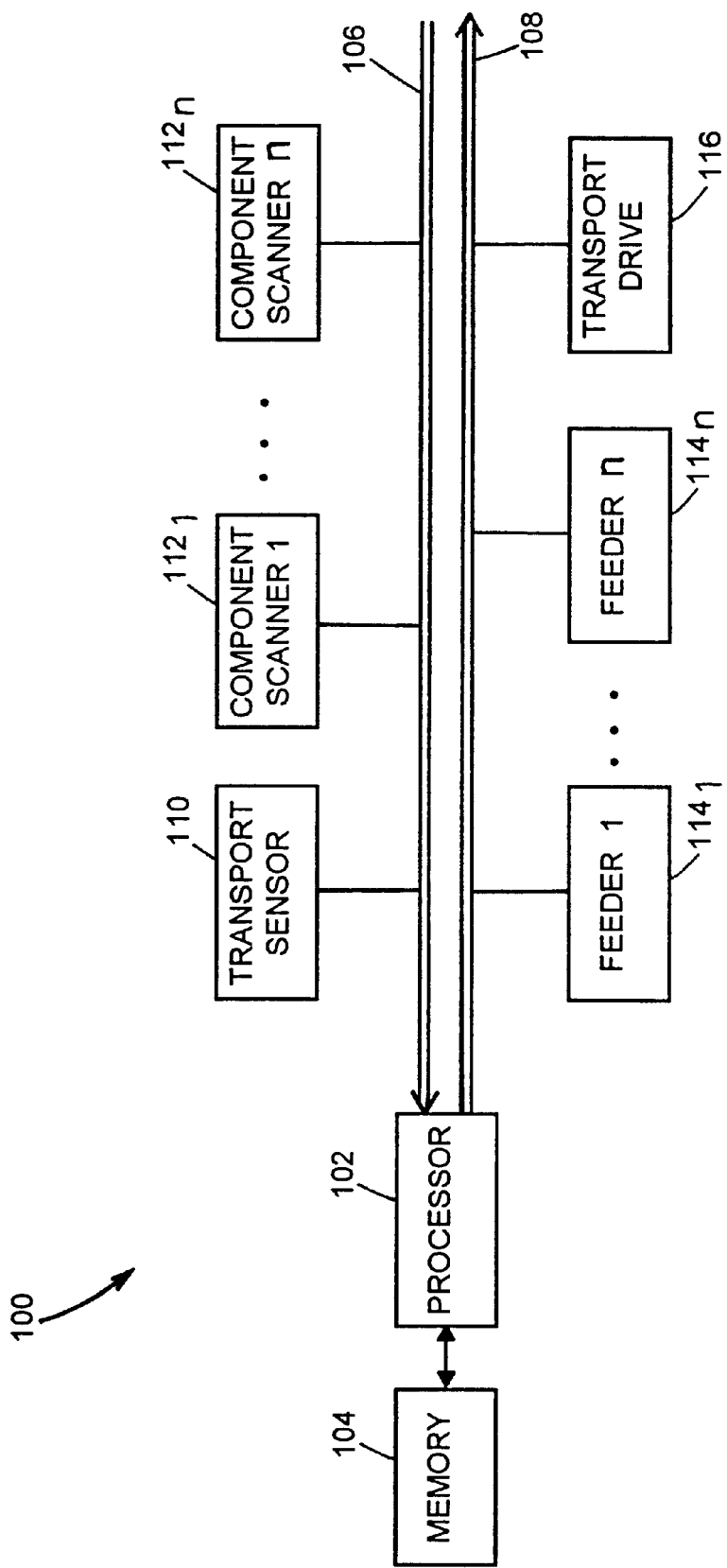
FIG. 2 illustrates a control system for controlling the package assembly line illustrated in FIG. 1.

The package assembly line 10 includes a control system 100. The control system 100 is illustrated in FIG. 2 and is provided in order to control the assembly of packages by the package assembly line 10 shown in FIG. 1. Although the control system 100 typically controls all aspects of the package assembly line 10, the control system 100 has been illustrated in FIG. 2 only insofar as it relates to the present invention.

Accordingly, the control system 100 includes a processor 102. The processor 102 may be a single central processor or several distributed processors, and controls the functions of the package assembly line 10. A memory 104 connected to the processor 102 stores the data file supplied by, for example, a publisher. This data file contains the list of customers, including customer names and addresses, to whom packages are to be mailed or otherwise delivered. An entry in the data file relating to a customer's name and address is referred to herein as a label. The customer data contained in the data file stored in the memory 104 either may be arranged in the proper sequences for achieving the desired delivery (e.g., postal) discounts or may be sorted by the processor 102 in order to be in the proper sequence for achieving these delivery discounts. For each customer who is to receive a pre-personalized onsert, that customer's label in the data file also contains a component identifier associated with each such customer. The label indicates that the customer is to receive a pre-personalized onsert.

The memory 104 also stores a component sequence list. The component sequence list may be stored in the memory 104 separately from the data file, or the component sequence list may be stored in the memory 104 as part of the data file. Whether the component sequence list is stored separately from the data file or as part of the data file, the component sequence list may be based upon the customer data in the data file or may be an entirely separate list supplied, for example, by a supplier who has created the pre-personalized onserts which are to be fed by the pre-personalized onsert feeder 74 of the package assembly line 10.

The component sequence list contains the component identifiers in the sequence corresponding to the desired sequence in which components are to be fed to the transport 42. By properly matching the component identifiers in the data file, in the component sequence list, and on the components, the control system 100 ensures that a component is fed to the transport space of the transport 42 containing the matching piece. In the case of pre-personalized onserts, the control system 100 ensures that, if a piece is to receive a pre-personalized onsert, a matching pre-personalized onsert is fed to the transport space of the transport 42 containing a piece or else, if a pre-personalized onsert cannot be fed as intended, a generic onsert is fed in its place.

The processor 102 also has connected thereto an input bus 106 and an output bus 108. A transport sensor 110 is connected to the input bus 106 and provides signals to the processor 102 indicating the movement of the transport 42. Accordingly, the control system 100 may synchronize the movement of the transport 42 to the feeding of the various pieces and components in the assembling of packages. For example, the transport sensor 110 may be a pulse encoder driven by the transport 42 for supplying a pulse signal to the processor 102 to indicate each time that the transport 42 moves one full transport space. Other known sensors may alternatively be used for the transport sensor 110.

A plurality of detectors, such as component scanners $112_1$ through $112_n$, detect component identifiers on the components fed toward the transport 42 and provide the detected component identifiers over the input bus 106 to the processor 102. For example, the first detector 78 may correspond to one of the component scanners $112_1$–$112_n$ and the second detector 80 may correspond to another of the component scanners $112_1$–$112_n$.

In response to the transport sensor 110 and the component scanners $112_1$–$112_n$, the processor 102 controls the various feeders and transport drive over the output bus 108. Specifically, a plurality of feeders $114_1$–$114_n$ and a transport drive 116 are connected to the output bus 108. Accordingly, the processor 102 controls the transport drive 116 and the feeders $114_1$–$114_n$ in response to the input signals it receives over the input bus 106 from the transport sensor 110 and the component scanners $112_1$–$112_n$. Thus, the transport drive 116 drives the transport 42, and the feeders $114_1$–$114_n$ feed pieces and components to the transport 42, all under control of the processor 102.

In order to control the feeders $114_1$–$114_n$ and the transport drive 116 in response to the input signals from the transport sensor 110 and the component scanners $112_1$–$112_n$, the processor 102 executes a program 200 as represented by the flow chart of FIG. 3A–3F. At the start of the execution of the program 200, a block 202 fetches the component sequence list from the memory 104, and a block 204 determines from the output of the transport sensor 110 whether or not the transport has moved one transport space. If the transport 42 has not moved one transport space, the program 200 waits until the transport 42 has moved one transport space.

When the block 204 determines that the transport 42 has moved one transport space, a block 206 finds the next label in the data file. This next label now becomes the current label. This label contains a customer name and address of the next customer for whom a package is to be assembled by the package assembly line 10. A block 208 determines whether or not this current label requires a component. If the package being assembled for this particular customer does not require a component, a block 210 assigns this current label to a transport space. Accordingly, when this transport space arrives at the specific piece feeder 30–40 containing the piece corresponding to the customer identified by the current label, this specific piece feeder 30–40 is controlled by the processor 102 over the output bus 108 in order to feed the correct piece to the correct transport space. After the block 210 assigns the current label to its corresponding transport space, the program 200 returns through connectors B and A to wait for the next transport space.

On the other hand, if the block 208 determines that the current label requires a component, a block 212 sets a variable n equal to zero. A block 214 determines whether FLAG has been set to missing. If the block 214 determines that FLAG has been set to missing, a block 216 resets FLAG. If the block 214 determines that FLAG has not been set to missing, a block 217 advances the component feeder (e.g., the pre-personalized onsert feeder 74) to the next component. This next component becomes the current component. The block 217 also causes the first detector 78 to read the component identifier on the current component. After the block 216 resets FLAG, or after the block 217 advances the component feeder and causes the first detector 78 to read the component identifier on the current component, a block 218 determines whether the current component matches a label stored in a queue. The queue holds any labels for which packages cannot be assembled at the time that the corresponding label is processed. If the current component matches a label that has already been stored in the queue, a block 220 assigns the matching label from the queue to a corresponding transport space so that the current component will be fed to the transport space occupied by the piece corresponding to the label from the queue. Thereafter, a block 222 deletes this label from the queue, a block 224 resets FLAG to its unset value, and the program 200 returns to the block 214 through the connector C.

On the other hand, if the block 218 (FIG. 3B) determines that the current component does not match a label in the queue, a block 226 compares the component identifier on the current component to the k surrounding components contained in the component sequence list stored in the memory 104. The k surrounding components are the closest components in the component sequence list on both sides of the current component; these closest components total k in number, where k may be any desired number. Based upon this comparison, a block 228 sets FLAG for this component to an appropriate value.

For example, the block 226 may determine that the current component is a duplicate of the previously advanced component. In this event, the block 228 sets FLAG to a value indicating that the current component is a duplicate. Alternatively, the block 226 may determine that the current component is way out of sequences or is unknown. If so, the block 228 sets FLAG to a value indicating that the current component is way out of sequences or is unknown. As a still further alternative, the block 226 may determine that a component corresponding to the current label is missing. If so, the block 228 sets FLAG to a value indicating that a component corresponding to the current label is missing. The block 228 sets FLAG according to the following priority: if the current component is a duplicate of a previously advanced component, the block 228 sets FLAG to a value indicating that the current component is a duplicate; otherwise, if the current component is way out of sequences or is unknown, the block 228 sets FLAG to a value indicating that the current component is way out of sequences or is unknown; otherwise, if a component corresponding to the current label is missing, the block 228 sets FLAG to a value indicating that a component corresponding to the current label is missing.

Thereafter, a block 230 determines whether the component identifier of the current component matches the component identifier stored with the current label. If so, the program 200 proceeds to the block 210 of FIG. 3A where the block 210 assigns the current label to the appropriate transport space.

However, if the block 230 determines that the current component does not match the current label, a block 232 determines whether FLAG has been set by the block 228 to a value indicating that a component corresponding to the current label is missing. If the block 232 determines that FLAG was set to a value indicating that a component corresponding to the current label is missing, a block 234 puts the current label in the queue because the current label requires a component but does not have a corresponding component in the component feeder, at least as of this time. The program 200 then proceeds through connectors B and A to wait for the next transport space.

If the block 232 determines from FLAG that a component is not missing, a block 236 (FIG. 3C) determines whether FLAG was set to a value indicating that the current component is a duplicate of a prior component. If the block 236 determines that FLAG was set to a value indicating that the current component is a duplicate of a prior component, a block 238 schedules the current component for reject, a block 240 increments the variable n by one, and a block 242 determines whether the variable n is equal to a limit $n_{max}$. If the block 242 determines that the variable n is equal to $n_{max}$, a block 244 stops the package assembly line 10 so that an operator can determine the extent to which there are duplicate components.

Accordingly, the blocks 240–244 stop the package assembly line 10 if the number of duplicates of a component reaches a predetermined limit.

If the block 242 determines that the variable n has not reached $n_{max}$, a block 246 resets FLAG to its unset value, and the program 200 returns to the block 214 through the connector C in order to advance the component feeder to the next component and to read its component identifier.

If the block 236 determines that FLAG has not been set to a value indicating that the current component is a duplicate component, a block 248 determines whether FLAG has been set to a value indicating that the current component is way out of sequence or is unknown. If the block 248 determines that the current component is way out of sequence or is unknown, a block 250 schedules the current component for reject, a block 252 resets FLAG to its unset value, and the program 200 returns to the block 214 through the connector C.

On the other hand, if the block 248 determines that FLAG has not been set to a value indicating that the current component is way out of sequence or is unknown, a block 254 searches the data file up to the next postal break in an attempt to find a label in the data file which corresponds to the current component. Although this break is referred to as a postal break, it should be understood that such a break could be a break of any delivery system and is intended to designate a geographical area upon which a delivery discount is based.

A block 256 determines whether there is a match between the current component and the labels in the data file up to the next postal break. If the block 256 determines that there is a match between the current component and a label in the data file, a block 258 (FIG. 3D) determines whether a package for this label has already been assembled. If the block 258 determines that a package for this label has already been assembled, a block 260 schedules the current component for reject, a block 262 resets FLAG to its unset value, and the program 200 proceeds through connectors B and A to wait for the next transport space.

On the other hand, if the block 258 determines that a book for this label has not already been made, a block 264 rearranges (i.e., re-sequences) the order of the labels in the data file by moving the matching label from its position in the data file to the place in the data file occupied by the current label and by positioning the current label one position downstream in the data file. The block 264 then assigns the moved and matching label to a corresponding transport space so that the current component will be fed to the transport occupied by the piece corresponding to the moved and matching label from the data file. Thereafter, a block 266 resets FLAG to its unset value, and the program 200 proceeds through connectors B and A to wait for the next transport space.

If the block 256 (FIG. 3C) determines that the next component does not match one of the labels in the data file up to the next postal break, a block 268 (FIG. 3E) schedules the current component for reject, a block 272 resets FLAG to its unset value, and the program 200 returns to the block 214 through the connector C.

A block 274 (FIG. 3F) is entered from the block 210, the block 234, the block 262, or the block 266. The block 274 determines whether all labels within a postal break have been assigned to a transport space or have been put in the queue. If all labels within a postal break have not been assigned to a transport space or put into the queue, the program 200 returns through connector A to wait for the next transport space. On the other hand, if the block 274 determines that all of the labels within a postal break have been assigned to a transport space or have been put in the queue, a block 276 empties the queue by scheduling replacement pieces and components for each of the labels in the queue. Accordingly, a replacement piece is fed to the transport 42 along with a generic onsert. The ink jet printer 76 is then scheduled to print the name and address of the corresponding label on the generic onsert as the piece and onsert move along the transport 42.

When all labels in the queue have been so processed, a block 278 determines whether all postal breaks and labels have been processed. If not, a block 280 increments the program 200 to the next postal break, and the program 200 returns through the connector A to wait for the next transport space. If all postal breaks and labels have been processed, a block 282 causes reports of exceptions to be generated.

Such reports may include reports on whose books were modified from plan. For example, a customer who was to receive a pre-personalized onsert but instead received a generic onsert is an exception and should be reported in an exceptions report. After generation of such reports, the program 200 is ended.

The operation of the program 200 shown in FIGS. 3A–3F can be better understood by a set of exemplary data shown in FIG. 4. This representative data includes a data file 300 which includes a sequence of fourteen exemplary labels within one postal break, it being understood that each label includes a customer name, a customer address matching the customer name, and a label identifier. Also included in the exemplary data is a set of component identifiers 302 as read by the first detector 78, a component sequence list 304, and a queue 306. The set of component identifiers 302 represent the sequence of the components contained in the hopper of the feeder 74, and the component sequence list 304 denotes the intended feeding sequence of the components. The queue 306 is initially empty at the beginning of a postal break.

Each label identifier in the data file 300 either has an identifier which is identical, or corresponds, to a component sequence identifier in the component sequence list 304, or the label identifier contains an indication, such as the x associated with label E, to indicate that the label E does not require a component. Thus, each label identifier in the data file 300, and its corresponding component sequence identifier in the component sequence list 304, are identical. Alternatively, each label identifier in the data file 300, and its corresponding component sequence identifier in the component sequence list 304, may be coupled by a look up table or other suitable link. Also, although the label and components have been identified in FIG. 4 by letters of the alphabet, it should be understood that these labels and components may be identified by any combination of letters, numbers, and/or other characters.

Figure 3A:
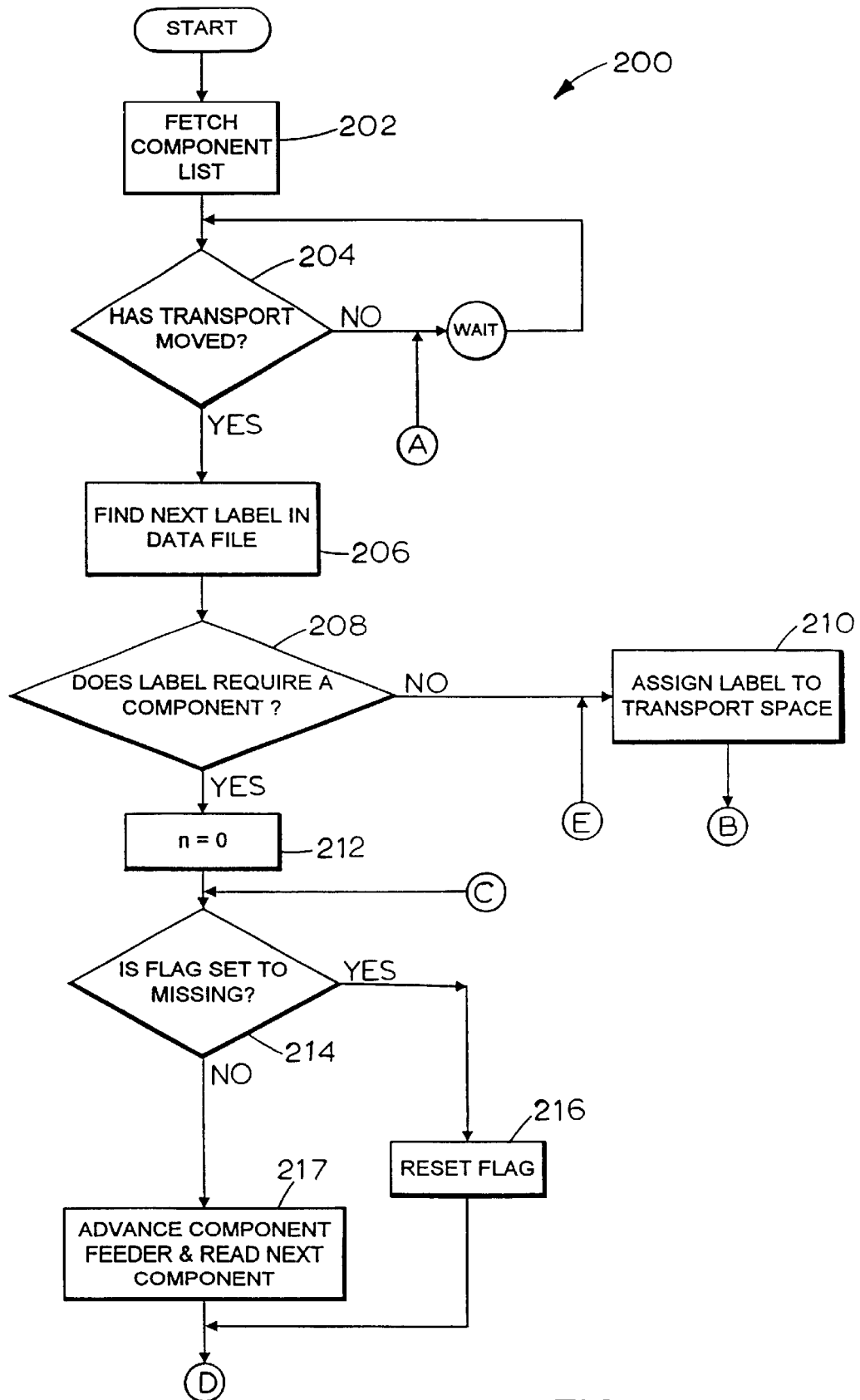
Figure 3B:
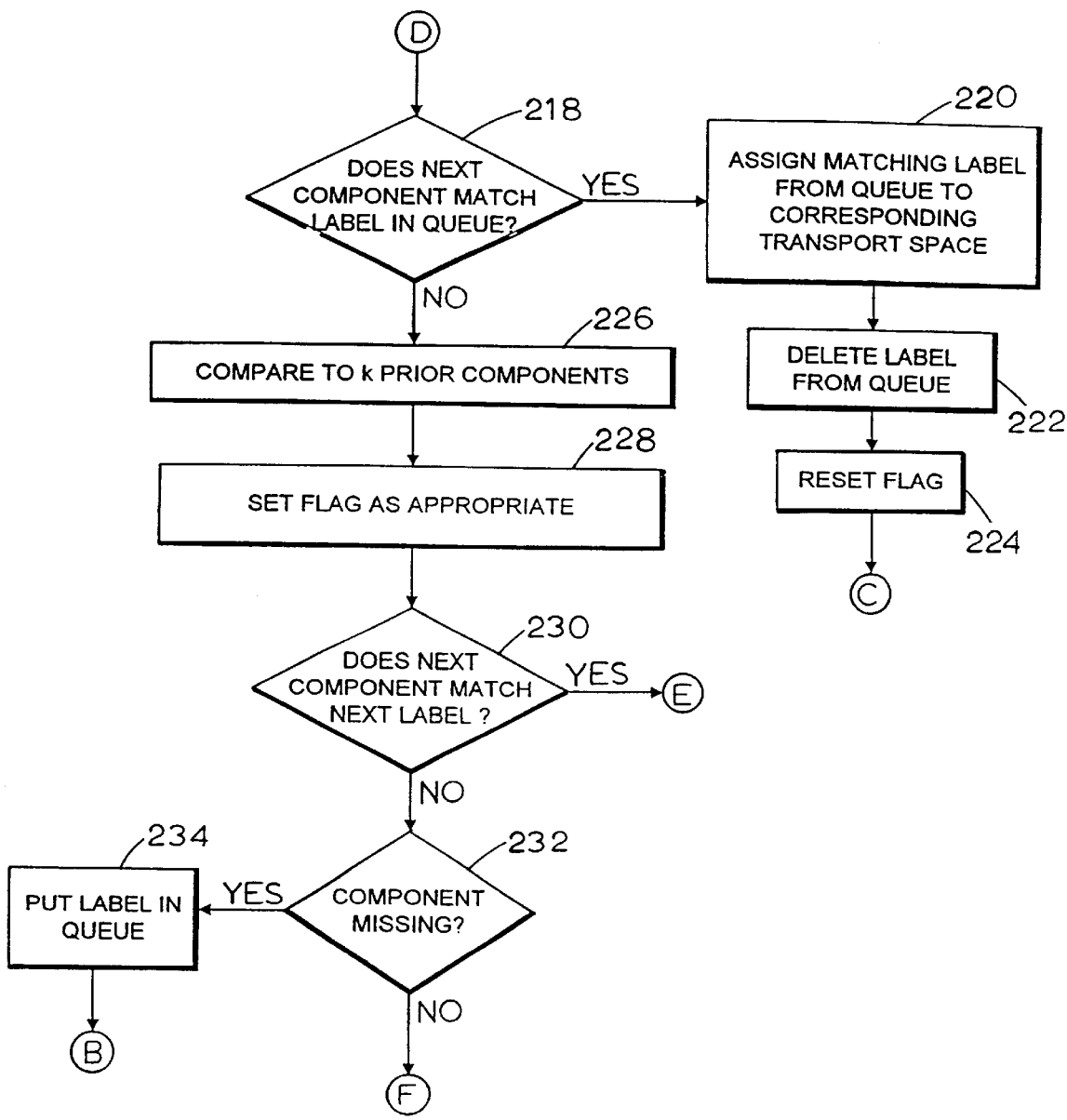
Figure 3C:
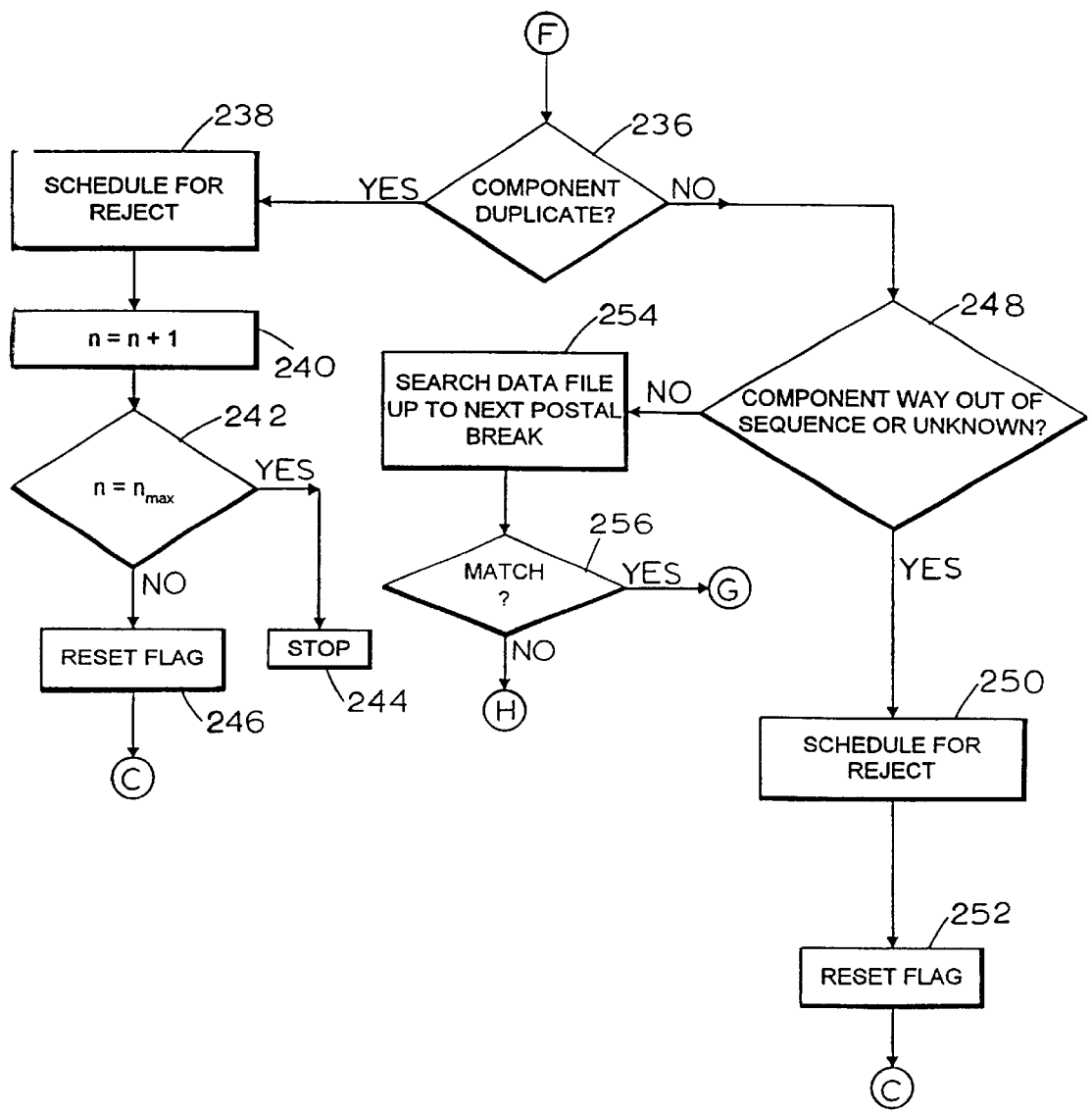

In assembling the pieces A–N and the components A–N of FIG. 4 into packages, the block 204 of FIG. 3A determines that the transport has moved one transport space, and the block 206 finds the next label A in the data file 300. The block 208 determines that the label A requires a component, i.e., the label A is not identified with an x. The block 212 sets the variable n equal to 0, the block 214 determines that FLAG has not been set to missing, and the block 217 advances the component feeder to the next component A and reads the component identifier from the component A. The block 218 (FIG. 3B) determines that the component A does not match a label stored in the queue 306. Then, the block 226 compares the component A to the k surrounding components in the component sequence list 304 in order to determine whether the component A is a duplicate, way out of sequence, or unknown, or whether the component corresponding to the label A is missing, as compared to the k surrounding components in the component sequence list 304. Because the component A is not a duplicate, way out of sequence, or unknown, and because the component corresponding to the label A is not missing, as compared to the k surrounding components in the component sequence list 304, the block 228 does not set FLAG to any value.

The block 230 determines that the component A matches the label A and, therefore, the block 210 assigns the label A to a corresponding transport space, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label B in the data file 300. The block 208 determines that the label B requires a component, and the block 212 sets the variable n equal to 0. The block 214 determines that FLAG has not been set to missing, and the block 217 advances the component feeder to the component B and reads the component identifier from the component B. The block 218 (FIG. 3B) determines that the component B does not match a label stored in the queue 306. The block 226 compares the component B to the k surrounding components in the component sequence list 304 in order to determine if the component B is a duplicate, way out of sequence, or unknown, or if the component corresponding to the label B is missing, as compared to the k surrounding components in the component sequence list 304. Because the component B is not a duplicate, way out of sequence, or unknown, and because the component corresponding to the label B is not missing, as compared to the k surrounding components in the component sequence list 304, the block 228 does not set FLAG to any value. The block 230 determines that the component B matches the label B. Therefore, the block 210 assigns the label B to a corresponding transport space, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label C in the data file 300. The block 208 determines that the label C requires a component, the block 212 sets the variable n equal to 0, and the block 214 determines that FLAG has not been set to a value of missing. The block 217 advances the component feeder to the next component B and reads the component identifier from the component B. As shown in FIG. 4, this next component is a duplicate component. The block 218 (FIG. 3B) determines that the duplicate component B does not match a label stored in the queue 306. The block 226 compares the component B to k surrounding components in the component sequence list 304 in order to determine if the component B is a duplicate, way out of sequence, or unknown, or if the component corresponding to the label C is missing, as compared to the k surrounding components in the component sequence list 304. Because the component B is a duplicate of the prior component B, the block 228 sets FLAG to indicate that the component B is a duplicate component. The block 230 determines that the label C and the duplicate component B do not match, and the block 232 determines that FLAG has not been set to a value of missing.

The block 236, however, determines that FLAG has been set to a value of duplicate indicating that the component B is a duplicate. Accordingly, the block 238 schedules the duplicate component B to be rejected by the reject/feed gate 82, the block 240 increments the variable n by one, and the block 242 determines whether the variable n is equal to a limit $n_{max}$. If the block 242 determines that the variable n is equal to $n_{max}$, the block 244 stops the package assembly line 10 so that an operator can determine the extent to which there are duplicate components. However, because the block 242 determines that the variable n is not equal to $n_{max}$ at this time, the block 246 resets FLAG to its unset value, and the program 200 returns to the block 214.

The block 214 determines that FLAG has not been set to missing, and the block 217 advances the component feeder to the next component D and reads the component identifier from the component D. The block 218 (FIG. 3B) determines that the component D does not match a label stored in the queue 306. (It should be noted that the label C has not yet been put into the queue 306.) The block 226 compares the component D to k surrounding components in the component sequence list 304 in order to determine if the component D is a duplicate, way out of sequence, or unknown, or if the component corresponding to the label C is missing, as compared to the k surrounding components in the component sequence list 304. Because the component C is missing as compared to the k surrounding components in the component sequence list 304, the block 228 sets FLAG to a value of missing. The block 230 determines that the label C and the component D do not match, and the block 232 determines that FLAG has been set to a value of missing.

Because the block 232 determines that FLAG has been set to the value of missing, the block 234 puts the label C in the queue 306 as shown in FIG. 4, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label D in the data file 300. The block 208 determines that the label D requires a component, the block 212 sets the variable n equal to 0, and the block 214 determines that FLAG has been set to a value of missing. Accordingly, the block 217 is bypassed and, instead, the block 216 resets FLAG to its unset value. The block 218 (FIG. 3B) determines that the component D does not match a label stored in the queue 306. The block 226 compares the component D to the k surrounding components in the component sequence list 304 in order to determine if the component D is a duplicate, way out of sequence, or unknown, or if the component corresponding to the label D is missing, as compared to the k surrounding components in the component sequence list 304. Because the component D is not a duplicate, way out of sequence, or unknown, and because the component corresponding to the label D is not missing, as compared to the k surrounding components in the component sequence list 304, the block 228 does not set FLAG to any value. The block 230 determines that the component D matches the label D and, therefore, the block 210 assigns the label D to a corresponding transport space, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label Ex in the data file 300. The block 208 determines that the label Ex does not require a component (because of the designator x). Accordingly, the block 210 assigns the label E to a corresponding transport space, and the program 200 returns to the block 204 to wait for the next transport space.

When the transport 42 moves one transport space, the block 206 finds the next label F in the data file 300. The block 208 determines that the label F requires a component, the block 212 sets the variable n equal to 0, and the block 214 determines that FLAG has not been set to a value of missing. The block 217 advances the component feeder to the next component AH and reads the component identifier from the component AH. The block 218 (FIG. 3B) determines that the component AH does not match a label stored in the queue 306. The block 226 compares the component AH to the k surrounding components in the component sequence list 304 in order to determine if the component AH is a duplicate, way out of sequence, or unknown, or if the component corresponding to the label F is missing, as compared to the k surrounding components in the component sequence list 304. Because the component AH is way out of sequence, the block 228 sets FLAG to indicate that the component AH is way out of sequence. The block 230 determines that the label F and the component AH do not match, the block 232 determines that FLAG has not been set to a value of missing, and the block 236 determines that FLAG has not been set to a value of duplicate.

The block 248, however, determines that FLAG has been set to a value of way out of sequence. Therefore, the block 250 schedules the way out sequence component AH to be rejected by the reject/feed gate 82, the block 252 resets FLAG to its unset value, and the program 200 returns to the block 214.

The block 214 determines that FLAG has not been set to a value of missing. The block 217 advances the component feeder to the next component * and reads the component identifier from the component *. The block 218 (FIG. 3B) determines that the component * does not match a label stored in the queue 306. The block 226 compares the component * to the k surrounding components in the component sequence list 304 in order to determine if the component AH is a duplicate, way out of sequence, or unknown, or if the component corresponding to the label F is missing, as compared to the component sequence list 304. Because the component \*\*\* is nonsensical and is therefore unknown, the block 228 sets FLAG to indicate that the component \*\*\* is unknown. The block 230 determines that the label F and the component \*\*\* do not match, the block 232 determines that FLAG has not been set to a value of missing, and the block 236 determines that FLAG has not been set to a value of duplicate.

The block 248, however, determines that FLAG has been set to a value of unknown. Therefore, the block 250 schedules the unknown component \*\*\* to be rejected by the reject/feed gate 82, the block 252 resets FLAG to its unset value, and the program 200 returns to the block 214.

The block 214 determines that FLAG has not been set to a value of missing. The block 217 advances the component feeder to the next component G and reads the component identifier from the component G. The block 218 (FIG. 3B) determines that the component G does not match a label stored in the queue 306. The block 226 compares the component G to the k surrounding components in the component sequence list 304 in order to determine if the component G is a duplicate, way out of sequence, or unknown, or if the component corresponding to the label F is missing, as compared to the k surrounding components in the component sequence list 304. Because the component F is missing as compared to the k surrounding components in the component sequence list 304, the block 228 sets FLAG to a value of missing. The block 230 determines that the label F and the component G do not match.

The block 232, however, determines that FLAG has been set to a value of missing. Because the block 232 determines that FLAG has been set to the value of missing, the block 234 puts the label F in the queue 306 as shown in FIG. 4, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label G in the data file 300. The block 208 determines that the label G requires a component, and the block 212 sets the variable n equal to 0. The block 214 determines that FLAG has been set to missing, the block 216 resets FLAG, and the block 217 is bypassed. The block 218 (FIG. 3B) determines that the component G does not match a label stored in the queue 306. The block 226 compares the component G to the k surrounding components in the component sequence list 304 in order to determine if the component G is a duplicate, way out of sequence, or unknown, or if a component corresponding to the label F is missing, as compared to the k surrounding components in the component sequence list 304. Because the component G is not a duplicate, way out of sequence, or unknown, and because a component corresponding to the label F is not missing, as compared to the k surrounding components in the component sequence list 304, the block 228 does not set FLAG to any value. The block 230 determines that the component G matches the label G and, therefore, the block 210 assigns the label G to a corresponding transport space, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label H in the data file 300. The block 208 determines that the label H requires a component, and the block 212 sets the variable n equal to 0. The block 214 determines that FLAG has not been set to missing, and the block 217 advances the component feeder to the next component H and reads the component identifier from the component H. The block 218 (FIG. 3B) determines that the component H does not match a label stored in the queue 306. The block 226 compares the component H to the k surrounding components in the component sequence list 304 in order to determine if the component H is a duplicate, way out of sequence, or unknown, or if a component corresponding to the label H is missing, as compared to the k surrounding components in the component sequence list 304. Because the component H is not a duplicate, way out of sequence, or unknown, and because a component corresponding to the label H is not missing, as compared to the k surrounding components in the component sequence list 304, the block 228 does not set FLAG to any value. The block 230 determines that the component H matches the label H and, therefore, the block 210 assigns the label H to a corresponding transport space, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label I in the data file 300. The block 208 determines that the label I requires a component, and the block 212 sets the variable n equal to 0. The block 214 determines that FLAG has not been set to missing, and the block 217 advances the component feeder to the next component C and reads the component identifier from the component C. The block 218 determines that the component C matches the label C stored in the queue 306. Therefore, the block 220 assigns the matching label C from the queue 306 to a corresponding transport space so that the component C will be fed to this transport space occupied by the piece corresponding to the label C from the queue 306. Thereafter, the block 222 deletes the label C from the queue 306, the block 224 resets FLAG to its unset value, and the program 200 returns to the block 214.

The block 214 determines that FLAG has not been set to a value of missing. The block 217 advances the component feeder to the next component I and reads the component identifier from the component I. The block 218 (FIG. 3B) determines that the component I does not match a label stored in the queue 306. The block 226 compares the component I to the k surrounding components in the component sequence list 304 in order to determine if the component I is a duplicate, way out of sequence, or unknown, or if a component corresponding to the label I is missing, as compared to the k surrounding components in the component sequence list 304. Because the component I is not a duplicate, way out of sequence, or unknown, and because a component corresponding to the label I is not missing, as compared to the k surrounding components in the component sequence list 304, the block 228 does not set FLAG to any value. The block 230 determines that the component I matches the label I and, therefore, the block 210 assigns the label I to its corresponding transport space, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label J in the data file 300. The block 208 determines that the label J requires a component, the block 212 sets the variable n equal to 0, and the block 214 determines that FLAG has not been set to a value of missing.

The block 217 advances the component feeder to the next component K and reads the component identifier from the component K. The block 218 (FIG. 3B) determines that the component K does not match a label stored in the queue 306. The block 226 compares the component K to the k surrounding components in the component sequence list 304 in order to determine if the component K is a duplicate, way out of sequence, or unknown, or if a component corresponding to the label J is missing, as compared to the k surrounding components in the component sequence list 304. Because the component K is not a duplicate, way out of sequence, or unknown, and because a component corresponding to the label J is not missing, as compared to the k surrounding components in the component sequence list 304, the block 228 does not set FLAG to any value. The block 230 determines that the label J and the component K do not match, and the block 232 determines that FLAG has not been set to a value of missing. The block 236 determines that FLAG has not been set to a value of duplicate, and the block 248 determines that FLAG has not been set to way out of sequence or unknown.

Accordingly, the block 254 searches the data file 300 for the label K. The block 256 determines that there is a match within the current postal break between the component K and the label K in the data file 300. Accordingly, the block 258 determines that a book has not already been made for the label K, and the block 264 rearranges (i.e., re-sequences) the order of the labels in the data file by moving the matching label K from its original position in the data file 300 to the place in the data file 300 occupied by the label J and by positioning the label J one position downstream in the data file 300. The block 264 also assigns the moved and matching label K to a corresponding transport space so that the component K will be fed to the transport space occupied by the piece corresponding to the label K from the data file 300. The block 266 resets FLAG to its unset value, the block 274 (FIG. 3F) determines that the last label in the current postal break has not been processed, and the program 200 returns to the block 204 (FIG. 3A) to wait for the next transport space.

When the transport 42 moves one transport space, the block 206 finds the next label J in the data file 300. The block 208 determines that the label J requires a component, and the block 212 sets the variable n equal to 0. The block 214 determines that FLAG has not been set to missing, and the block 217 advances the component feeder to the next component J and reads the component identifier from the component J. The block 218 (FIG. 3B) determines that the component J does not match a label stored in the queue 306. The block 226 compares the component J to the k surrounding components in the component sequence list 304 in order to determine if the component J is a duplicate, way out of sequence, or unknown, or if a component corresponding to the label J is missing, as compared to the k surrounding components in the component sequence list 304. Because the component J is not a duplicate, way out of sequence, or unknown, and because a component corresponding to the label J is not missing, as compared to the k surrounding components in the component sequence list 304, the block 228 does not set FLAG to any value. The block 230 determines that the component J matches the label J and, therefore, the block 210 assigns the label J to its corresponding transport space, the block 274 (FIG. 3F) determines 7Z that the last label in the current postal break has not been processed, and the program 200 returns to the block 204 (FIG. 3A) to wait for the next transport space.

When the transport 42 moves one transport space, the block 206 finds the next label L in the data file 300. The block 208 determines that the label L requires a component, the block 212 sets the variable n equal to 0, and the block 214 determines that FLAG has not been set to a value of missing. The block 217 advances the component feeder to the next component P and reads the component identifier from the component P. The block 218 (FIG. 3B) determines that the component P does not match a label stored in the queue 306. The block 226 compares the component P to the k surrounding components in the component sequence list 304 in order to determine if the component P is a duplicate, way out of sequence, or unknown, or if a component corresponding to the label L is missing, as compared to the k surrounding components in the component sequence list 304. Because the component P is not a duplicate, way out of sequence, or unknown, and because a component corresponding to the label L is not missing, as compared to the k surrounding components in the component sequence list 304, the block 228 does not set FLAG to any value. The block 230 determines that the label L and the component P do not match, and the block 232 determines that FLAG has not been set to a value of missing. The block 236 determines that FLAG has not been set to a value of duplicate, and the block 248 determines that FLAG has not been set to way out of sequence or unknown.

Accordingly, the block 254 searches the data file 300 for the label P. The block 256 determines that there is no a match within the current postal break between the component P and the labels in the data file 300. Accordingly, the block 268 (FIG. 3E) schedules the component P for reject, the block 272 resets FLAG to its unset value, and the program 200 returns to the block 214.

The block 214 determines that FLAG has not been set to a value of missing. The block 217 advances the component feeder to the next component L and reads the component identifier from the component L. The block 218 (FIG. 3B) determines that the component L does not match a label stored in the queue 306. The block 226 compares the component L to the k surrounding components in the component sequence list 304 in order to determine if the component L is a duplicate, way out of sequence, or unknown, or if a component corresponding to the label L is missing, as compared to the k surrounding components in the component sequence list 304. Because the component L is not a duplicate, way out of sequence, or unknown, and because a component corresponding to the label L is not missing, as compared to the k surrounding components in the component sequence list 304, the block 228 does not set FLAG to any value. The block 230 determines that the component L matches the label L and, therefore, the block 210 assigns the label L to its corresponding transport space. The block 274 determines that the last package in the postal break 300 has not been assembled, and the program 200 returns to the block 204 (FIG. 3A) to wait for the next transport space.

The labels M and N match their corresponding components M and N and are, therefore, similarly processed and assigned to corresponding transport spaces. After the label N has been assigned by the block 210 to its corresponding transport space, the block 274 determines that the last label in the postal break 300 has been processed. Therefore, the block 276 empties the queue 306 by scheduling replacement pieces and components for each of the labels in the queue. Because the label F is the only label remaining in the queue 306, the block 276 schedules the feeding of the piece corresponding to the label F, schedules the feeding of a generic component from the generic onsert feeder 72, and schedules the ink jet printer 84 to print the name and address corresponding to the label F on the generic onsert. The block 278 determines whether all postal breaks and all labels have processed and, if not, the block 280 increments the program 200 to the next postal break, and the program 200 returns to the block 204 to begin processing the labels in the next postal break.

Certain modifications of the present invention have been discussed above. Other modifications will occur to those practicing in the art of the present invention. For example, the present invention has been described in detail in terms of a mail table, such that the packages being assembled are stuffed envelopes to be mailed or otherwise sent to customers, the pieces are different versions or titles of magazines, newspapers, catalogs, books, or the like, and the components are inserts/onserts. It should be understood, however, that the present invention also applies to other package assembly lines such as binding lines. In the case of binding lines, the packages which are assembled are magazines, newspapers, catalogs, books, or the like, and the pieces and components which are assembled into these packages are signatures and inserts/onserts, respectively. All such modifications are considered to be within the scope of the present invention as set out in the claims attached hereto.

What is claimed is:

1. A system for use in connection with a package assembly line, wherein the package assembly line has a piece feeder, a component feeder, and a transport, wherein the piece feeder is arranged to feed first and second pieces to the transport, wherein the component feeder is arranged to feed first and second components to the transport, wherein the first component has a first component identifier thereon, and wherein the second component has a second component identifier thereon, the system comprising:

a memory, wherein the memory stores a component sequence list containing component identifiers corresponding to a desired sequence in which components are to be fed by the component feeder;

a detector, wherein the detector is arranged to detect the first component identifier from the first component as the first component is fed by the component feeder toward the transport;

a comparator, wherein the comparator is arranged to compare the first component identifier to the component sequence list;

a component rejecter, wherein the component rejecter is responsive to the comparator to reject the first component if the first component identifier fails to match the component sequence list; and, a queue arranged to store a piece identifier if a corresponding component identifier is missing.

2. The system of claim 1 wherein the comparator compares the second component identifier to the component sequence list, and wherein the component rejecter rejects the second component, in response to comparing the detected second component identifier to the component sequence list, if the second component identifier is a duplicate of the first component identifier.

3. The system of claim 1 wherein the comparator compares the second component identifier to the component sequence list, and wherein the component rejecter rejects the second component, in response to comparing the detected second component identifier to the component sequence list, if the second component identifier is way out of sequence or unknown.

4. The system of claim 1 wherein the detector comprises a first detector, and wherein the system further comprises a second detector arranged to detect the first component identifier from the first component as the first component is fed by the component feeder toward the transport.

5. The system of claim 4 wherein the component feeder has a first end near a hopper containing the components, wherein the component feeder has a second end near the transport, wherein the first detector is located near the first end of the component feeder, and wherein the second detector is located near the second end of the component feeder.

6. A system for use in connection with a package assembly line, wherein the package assembly line has a piece feeder and a component feeder, wherein the piece feeder is arranged to feed pieces to a transport of the package assembly line, wherein the component feeder is arranged to feed components to the transport of the package assembly line so that the components and the pieces are combined into packages, and wherein the components have corresponding component identifiers thereon, the system comprising:

a memory, wherein the memory stores a piece data file, wherein the piece data file contains piece identifiers grouped by postal break, and wherein the piece identifiers correspond to pieces fed by the piece feeder;

a detector, wherein the detector is arranged to detect a component identifier from a component being fed by the component feeder to the transport;

a comparator, wherein the comparator is arranged to compare the detected component identifier to piece identifiers up to a corresponding postal break in the piece data file; and, a controller, wherein the controller is arranged to control feeding of the component to the transport in response to the detected component identifier.

7. The system of claim 6 wherein the controller re-sequences the piece data file if the detected component identifier fails to match a corresponding piece identifier but matches another piece identifier contained within the corresponding postal break of the piece data file.

8. The system of claim 7 wherein the controller comprises a queue arranged to store the corresponding piece identifier if the detected component identifier fails to match the corresponding piece identifier and if a component corresponding to the corresponding piece identifier is missing.

9. The system of claim 8 wherein the controller comprises a scheduler, and wherein the scheduler is arranged to schedule a replacement piece corresponding to a piece identifier in the queue if the detected component identifier matches the piece identifier in the queue.

10. The system of claim 9 wherein the comparator is a first comparator, and wherein the controller comprises a second comparator arranged to compare the detected component identifier to a component sequence list.

11. The system of claim 10 wherein the system further comprises a component rejecter, and wherein the component rejecter is arranged to reject the component, in response to comparing the detected component identifier to the component sequence list, if the detected component identifier is a duplicate.

12. The system of claim 10 wherein the system further comprises a rejecter, and wherein the rejecter is arranged to reject the component, in response to comparing the detected component identifier to the component sequence list, if the detected component identifier is way out of sequence or unknown.

13. The system of claim 10 wherein the controller comprises a third comparator arranged to compare the detected component identifier to any piece identifiers in the queue.

14. The system of claim 13 wherein the controller is arranged to assign a queued piece identifier to a transport space and to delete the queued piece identifier from the queue if the detected component identifier matches the queued piece identifier.

15. The system of claim 14 wherein the controller is arranged to advance the component feeder to a next component if a component is a duplicate, wherein the detector detects a component identifier from the next component fed by the component feeder, and wherein the first comparator is arranged to compare the detected component identifier of the next component to the corresponding piece identifier.

16. The system of claim 15 wherein the transport is divided into transport spaces, and wherein the corresponding piece identifier corresponds to the detected component identifier of the component if a piece represented by the corresponding piece identifier and the component are at least initially scheduled to be fed to a common transport space.

17. The system of claim 6 wherein the controller comprises a queue, and wherein the queue stores the corresponding piece identifier if the detected component identifier fails to match the corresponding piece identifier and if a component identifier corresponding to the corresponding piece identifier is missing.

18. The system of claim 17 wherein the controller comprises a scheduler, and wherein the scheduler is arranged to schedule replacement pieces corresponding to piece identifiers in the queue.

19. The system of claim 18 wherein the comparator is a first comparator, wherein the controller comprises a second comparator, and wherein the second comparator is arranged to compare the detected component identifier to any piece identifiers in the queue.

20. The system of claim 19 wherein the controller assigns a queued piece identifier to a transport space and deletes the queued piece identifier from the queue if the detected component identifier matches the queued piece identifier.

21. The system of claim 20 wherein the controller advances the component feeder to a next component if a component is a duplicate, wherein the detector detects a component identifier from the next component fed by the component feeder, and wherein the first comparator compares the detected component identifier of the next component to the corresponding piece identifier.

22. The system of claim 6 wherein the controller is arranged to advance the component feeder to a next component if a component is a duplicate, wherein the detector detects a component identifier from the next component fed by the component feeder, and wherein the comparator compares the detected component identifier of the next component to the corresponding piece identifier.

23. A method of controlling a package assembly line, wherein the package assembly line has a piece feeder and a component feeder, wherein the piece feeder is arranged to feed pieces to a transport of the package assembly line, wherein the component feeder is arranged to feed components to the transport of the package assembly line so that the components and the pieces are combined into packages, and wherein the components have corresponding component identifiers thereon, the method comprising to following steps:
a) storing a piece data file, wherein the piece data file contains piece identifiers grouped by postal break, and wherein the piece identifiers correspond to pieces fed by the piece feeder;
b) detecting a component identifier from a component being fed by the component feeder to the transport;
c) comparing the detected component identifier to piece identifiers up to a corresponding postal break in the piece data file; and,
d) controlling feeding of the component to the transport in response to the detected component identifier.

24. The method of claim 23 wherein step d) comprises the step of re-sequencing the piece data file if the detected component identifier fails to match a corresponding piece identifier but matches another piece identifier contained within the corresponding postal break of the piece data file.

25. The method of claim 24 wherein step d) comprises the step of adding the corresponding piece identifier to a queue if the detected component identifier fails to match the corresponding piece identifier and if a component corresponding to the corresponding piece identifier is missing.

26. The method of claim 25 wherein step d) comprises the step of scheduling a replacement piece corresponding to a piece identifier in the queue if the detected component identifier matches the piece identifier in the queue.

27. The method of claim 26 wherein step d) comprises the step of comparing the detected component identifier to a component sequence list.

28. The method of claim 27 wherein step d) comprises the step of rejecting the component, in response to comparing the detected component identifier to the component sequence list, if the detected component identifier is a duplicate.

29. The method of claim 27 wherein step d) comprises the step of rejecting the component, in response to comparing the detected component identifier to the component sequence list, if the detected component identifier is way out of sequence or unknown.

30. The method of claim 27 wherein step d) comprises the step of comparing the detected component identifier to any piece identifiers in the queue.

31. The method of claim 30 wherein step d) comprises the following steps:
assigning a queued piece identifier to a transport space; and,
deleting the queued piece identifier from the queue if the detected component identifier matches the queued piece identifier.

32. The method of claim 31 wherein step d) comprises the step of advancing the component feeder to a next component if a component is a duplicate, wherein step b) comprises the step of detecting a component identifier from the next component fed by the component feeder, and wherein step c) comprises the step of comparing the detected component identifier of the next component to the corresponding piece identifier.

33. The method of claim 32 wherein the transport is divided into transport spaces, and wherein the corresponding piece identifier corresponds to the detected component identifier of the component if a piece represented by the corresponding piece identifier and the component are at least initially scheduled to be fed to a common transport space.

34. The method of claim 23 wherein step d) comprises the step of adding the corresponding piece identifier to a queue if the detected component identifier fails to match the corresponding piece identifier and if a component identifier corresponding to the corresponding piece identifier is missing.

35. The method of claim 34 wherein step d) comprises the step of scheduling replacement pieces corresponding to piece identifiers in the queue.

36. The method of claim 35 wherein step d) comprises the step of comparing the detected component identifier to any piece identifiers in the queue.

37. The method of claim 36 wherein step d) comprises the following steps:

assigning a queued piece identifier to a transport space; and, deleting the queued piece identifier from the queue if the detected component identifier matches the queued piece identifier.

38. The method of claim 37 wherein step d) comprises the step of advancing the component feeder to a next component if a component is a duplicate, wherein step b) comprises the step of detecting a component identifier from the next component fed by the component feeder, and wherein step c) comprises the step of comparing the detected component identifier of the next component to the corresponding piece identifier.

39. The method of claim 23 wherein step d) comprises the step of advancing the component feeder to a next component if a component is a duplicate, wherein step b) comprises the step of detecting a component identifier from the next component fed by the component feeder, and wherein step c) comprises the step of comparing the detected component identifier of the next component to the corresponding piece identifier.

40. The method of claim 23 wherein step d) comprises the step of generating an exceptions report if the piece identifier fails to match a corresponding one of the component identifiers.

\* \* \* \* \*